April 19, 1960 B. K. KINARIWALA 2,933,703

ACTIVE IMPEDANCE BRANCH

Filed May 9, 1958

INVENTOR
B.K.KINARIWALA
BY Ralph T. Holcomb
ATTORNEY 2,933,703

ACTIVE IMPEDANCE BRANCH

Bharat K. Kinariwala, Bedminster, N.J., assignor to Bell Telephone Laboratories, Incorporated, New York, N.Y., a corporation of New York Application May 9, 1958, Serial No. 734,224

5 Claims. (Cl. 333—80)

This invention relates to wave transmission networks and more particularly to an active impedance branch of unrestricted impedance requiring no inductors for use in such networks.

An object of the invention is to remove the restrictions on the impedance of a two-terminal branch which includes no inductors. Other objects are to reduce the size and increase the reliability of an impedance branch of unrestricted impedance.

A two-terminal impedance branch having any physically realizable driving-point impedance may be provided if resistors, capacitors, and inductors of the required values are obtainable. But some impedance functions call for very large inductances which, in turn, necessitate physically large inductors. Also, if the branch is used at high frequencies, the stray capacitances associated with the inductors cause undesired impedance deviations. Furthermore, aging and temperature changes cause unwanted shifts in the inductance. Therefore, in many cases it is desirable to eliminate inductors entirely from the impedance branch if this can be done without restricting the impedance obtainable.

The present invention provides an active impedance branch which may have an unrestricted driving-point impedance Z with poles and zeroes at preselected frequencies but which requires no inductors. The branch comprises a passive four-terminal network, a negative-impedance converter connected at one end to one end of the network, and a two-terminal termination for the converter. The passive network and the termination are made up of resistors and capacitors only, and are thus of the type called R-C structures. However, special impedance relationships must apply. The driving-point impedance of the converter at the one end is the negative of the driving-point impedance of the network at the one end at the frequencies of the poles of Z when the network is open-circuited at the other end and also at the frequencies of the zeroes of Z when the network is short-circuited at the other end. In a small percentage of the applications, a second negative-impedance converter must be added ahead of the passive four-terminal network in order to provide an unrestricted impedance Z.

Negative-impedance converters may be made quite small, especially if transistors are used for the active elements. Also, the additional resistors and capacitors used in lieu of the inductors usually take less space. Therefore, the inductorless branch is generally smaller than an equivalent one using inductors. Also, the replacing converter, or converters, resistors, and capacitors in general are more constant with changes in temperature or aging than the inductors, and thus the impedance is more reliable.

The nature of the invention and its various objects, features, and advantages will appear more fully in the following detailed description of a typical embodiment illustrated in the accompanying drawing, of which:

Figure 1:
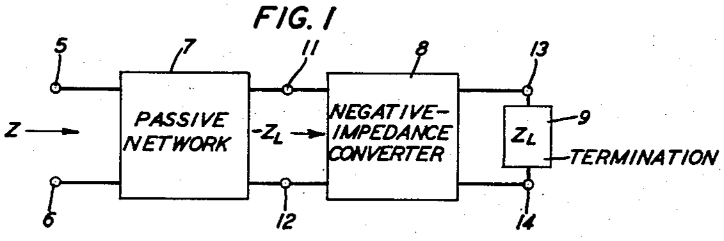
Fig. 1 is a block diagram of an impedance branch in accordance with the invention using a single negative-impedance converter.

In Fig. 1, an unrestricted driving-point impedance Z is provided between the terminals 5 and 6 by the combination of a passive network 7, a negative-impedance converter 8, and a termination 9. The converter 8 is connected at its left end to the right end of the network 7. The termination 9 is connected to the right end of the converter. The network 7 and the termination 9 require only resistors and capacitors and the network may generally be a ladder-type structure. However, in accordance with the invention, the impedance Z may, in most cases, having any physically realizable frequency characteristic with poles and zeroes placed at preselected frequencies in the complex frequency plane.

The negative-impedance converter 8 is an active four-terminal network which presents at its input terminals 11 and 12 the negative of the impedance $Z_L$ of the termination 9 connected to its output terminals 13 and 14. Any appropriate type of converter may be used. A suitable one is described by A. I. Larky in a paper entitled "Negative Impedance Converters," published in the I.R.E. Transactions on Circuit Theory, volume CT–4, pages 124 to 131, September 1957.

It will now be explained why the special relationships mentioned above must apply if Z is to be an unrestricted impedance. The impedance Z may be expressed as a rational function of the frequency $f$. However, the analysis is simplified by the introduction of the parameter $p$, called the complex frequency and defined as $$p=\sigma+j\omega \quad (1)$$

where $\sigma$ is the real part, $j\omega$ is the imaginary part, and $\omega$ is the radian frequency $2\pi f$.

Figure 3:
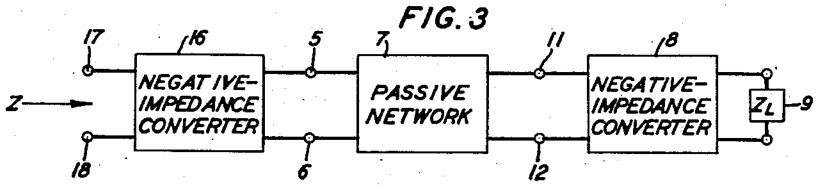
Fig. 3 is a block diagram of a second impedance branch in accordance with the invention, using two negative-impedance converters.

Thus, the impedance Z may be expressed as $$Z(p)=\frac{P}{Q} \quad (2)$$

where P and Q are polynomials in $p$. P and Q may each be replaced by the difference of two rational functions, giving $$Z(p)=\frac{\frac{P}{B}}{\frac{Q}{B}}=\frac{\frac{P_1}{P_2}-\frac{P_3}{P_4}}{\frac{Q_1}{P_2}-\frac{Q_3}{P_4}} \quad (3)$$

where B is a polynomial equal to $P_2P_4$, and $P_1$, $P_2$, $P_3$, $P_4$, $Q_1$, and $Q_3$ have only negative real roots. This is done by expressing $P/B$ and $Q/B$ in partial-fraction form and collecting terms of the same sign. The degree of B is the same as that of P or Q, whichever is higher. Under these conditions, the impedance $Z(p)$ may nearly always be furnished by the branch shown in Fig. 1. When this branch does not suffice, another negative-impedance converter must be added as shown in Fig. 3.

The impedance at the terminals 5 and 6 may be expressed as $$Z(p)=Z_1\frac{Z_3-Z_L}{Z_2-Z_L} \quad (4)$$

where $Z_1$ and $Z_2$ are the impedances of the network 7 at the terminals 5—6 and 11—12, respectively, when it is open-circuited at the other end, $Z_3$ is the impedance of the network 7 at the terminals 11—12 when it is short-circuited at the other end, and $Z_L$ is the impedance of the termination 9. It is apparent from the form of (4) that $Z(p)$ has a zero when $Z_3=Z_L$ and a pole when $Z_2=Z_L$.

In order to corelate the polynomials in (3) with the impedances used in (4), (3) may be rewritten as $$Z(p)=\frac{P_1}{Q_1}\frac{\frac{P_3}{P_1}-\frac{P_4}{P_2}}{\frac{Q_3}{Q_1}-\frac{P_4}{P_2}} \qquad (5)$$

By comparing the corresponding quantities in (4) and (5), the following identities are found:

$$Z_1=P_1/Q_1 \qquad (6)$$
$$Z_2=Q_3/Q_1 \qquad (7)$$
$$Z_3=P_3/P_1 \qquad (8)$$
$$Z_L=P_4/P_2 \qquad (9)$$

Without loss of generality, it will at first be assumed that $Z(p)$ has only complex zeroes and poles. Then $Z(p)$ is positive and real at all points on the real axis. From a consideration of (3), it is seen that the residues in the poles of $P/B$ and $Q/B$ have alternating signs in the alternate poles. Therefore, $Z_L$, which is given by $P_4/P_2$, is necessarily an R-C impedance. It will now be shown that the impedances $Z_1$, $Z_2$, and $Z_3$ represent a four-terminal, R-C network.

The transfer impedance $Z_4$ of the network 7 may be expressed as $$Z_4^2=Z_1Z_2-Z_1Z_3 \qquad (10)$$

Substituting the values of $Z_1$, $Z_2$, and $Z_3$ from (6), (7), and (8) gives $$Z_4=\frac{\sqrt{P_1Q_3-P_3Q_1}}{Q_1} \qquad (11)$$

Letting $\sqrt{P_1Q_3-P_3Q_1}=g$, (11) may be written as $$Z_4=g/Q_1 \qquad (12)$$

For physical realizability of the network 7, $Z_4$ must be a rational function and so $g^2$ must be a perfect square. Also, $Z_1$ and $Z_2$ must represent driving-point impedances of an R-C network, and the required residue condition must be satisfied at all the poles. It can be shown that the residue condition is always satisfied under the procedure outlined.

The condition that $Z_1$ and $Z_2$ must represent driving-point impedances of an R-C network will now be discussed. First, the case where $Z(p)$ is of rank 2 will be considered. In (3), the same constant can be added to each term of the numerator or to each term of the denominator without changing the value of Z. If this constant is properly chosen, $Z_1$ and $Z_2$ will represent R-C driving-point impedances. In addition, the constant can generally be so chosen as to make $(P_1Q_3-P_3Q_1)$ a perfect square, insuring that the network 7 will be physically realizable. An example is given below.

Next will be considered the general case, where the driving-point impedance $Z(p)$ is of any rank. It will be shown how $g^2$ can always be made a perfect square by introducing surplus factors in the original expression for $Z(p)$. This impedance may be written as $$Z(p)=\frac{P}{Q}=Z_1-\frac{Z_4^2}{Z_2-Z_L} \qquad (13)$$

Substituting (6), (7), (9), and (12) in (13) gives $$Z(p)=\frac{P_1}{Q_1}-\frac{g^2/Q_1^2}{\frac{Q_3}{Q_1}-\frac{P_4}{P_2}} \qquad (14)$$

$$=\frac{P_1}{Q_1}-\frac{g^2/Q_1^2}{(P_2Q_3-P_4Q_1)/P_2Q_1} \qquad (15)$$

From (3), $$P_2Q_3-P_4Q_1=-Q \qquad (16)$$

Substituting (16) in (15) gives $$Z(p)=\frac{P_1}{Q_1}+\frac{g^2/Q_1^2}{Q/P_2Q_1} \qquad (17)$$

$$=\frac{(P_1Q+g^2P_2)/Q_1}{Q} \qquad (18)$$

Therefore, $$P=(P_1Q+g^2P_2)/Q_1 \qquad (19)$$

and $$g^2P_2=PQ_1-P_1Q \qquad (20)$$

It can be shown that $Z(p)$ can be realized in the branch shown in Fig. 1 if (20) is satisfied, $P_1/Q_1$ and $Q_1/P_2$ are R-C impedances, and $g$ is a polynomial.

It is important to note that (20) contains P and Q, which are already known. Choice of $P_2$ is arbitrary. Freedom in the choice of $P_4$ is not explicit in (20). However, this freedom can be assigned to $Q_1$, since, from (14), (15), and (16) it can be shown that $-Q/Q_1P_2$ gives $Z_2$ and $Z_L$. Thus, $Q_1$ and $P_2$ can be considered to be arbitrary instead of $P_2$ and $P_4$. Further, one can consider that $P_1$ and $Q_1$ are arbitrary in (20). This follows since, if the conditions given above are satisfied, it does not matter whether $P_2$ and $Q_1$ are chosen independently and $P_1$ determined from (20) or $P_1$ and $Q_1$ are chosen and $P_2$ determined from (20).

Assume for the moment that it is somehow possible to find $P_1$, $Q_1$, and $P_2$ which satisfy the conditions. It will be shown that it is possible to make $g^2$ a complete square by introducing surplus factors. Once this point is clarified, it will be shown how $P_1$, $Q_1$, and $P_2$ can always be chosen to satisfy the conditions. P and Q are still assumed to have only complex conjugate roots. This restriction will be removed later without altering the arguments presented here. For convenience in discussion, $Z(p)$ is chosen to be of rank 2. Similar results are obtained for any rank.

Consider $Z(p)$ of rank 2, that is, that P and Q are of degree 2. It is apparent from (3) that $P_1$, $Q_1$, and $P_2$ are of degree 1. These are found such that the conditions are satisfied. $g^2$ may or may not be a perfect square. If $g^2$ is a perfect square, the problem is solved and the network can be realized. If $g^2$ is not a perfect square, surplus factors M are introduced in $Z(p)$, making $P'=PM$ and $Q'=QM$ of fourth degree. New polynomials $P_1'$, $Q_1'$ and $P_2'$ of second degree are required. Their determination will be discussed below. Then (20) may be written as $$g^2P_2'=M(PQ_1'-P_1'Q) \qquad (21)$$

In place of (21), consider $$PQ_1'-QP_1'=P_2'R \qquad (22)$$

If (22) is satisfied subject to the given constraints, where R is any remainder polynomial, one merely multiplies both sides of (22) by $M=R$ to give (21). Thus, it is seen how $g^2$ can be made a complete square by the introduction of an appropriate surplus factor M. All that remains to be shown is that (22) can be satisfied subject to the given constraints. This is no different from the problem of finding $P_1$, $Q_1$, and $P_2$ satisfying the conditions, which was assumed somehow possible. It will now be shown that it is possible to find polynomials $P_1$, $Q_1$ and $P_2$ such that $$PQ_1-P_1Q=P_2R \qquad (23)$$

subject to the constraints that $P_1/Q_1$ and $Q_1/P_2$ are R-C impedances.

Figure 2:
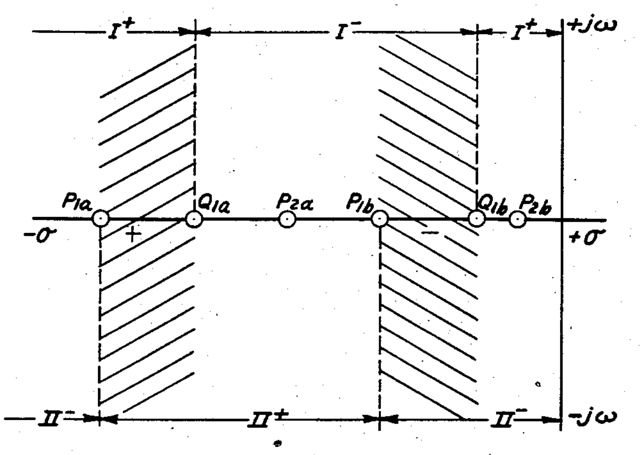
Fig. 2 is a complex frequency plane used in explaining the invention.

As discussed previously $P_1$ and $Q_1$ of appropriate degrees are chosen arbitrarily such that $P_1/Q_1$ is an R-C impedance. The roots of $P_1$ and $Q_1$ of second degree are shown in Fig. 2 on the complex frequency plane. The roots of $P_1$ are $P_{1a}$ and $P_{1b}$. The roots of $Q_1$ are $Q_{1a}$ and $Q_{1b}$. All roots lie on the real axis. No singularity is chosen at the origin for reasons that will soon become clear. Symbol I refers to the function $PQ_1$ and II refers to $-P_1Q$. The superscripts of I and II represent the corresponding signs of the values of the functions in the designated regions along the real axis. The shaded areas in the figure show regions where both functions have the same sign. The two shaded areas shown are of opposite sign. Therefore, there must be at least one zero of the function $(I+II)$ in the region between these two areas. Such a zero in this region is designated $P_{2a}$ and is assigned to $P_2$. Another zero of $P_2$ is required to the right of all the four roots so as to satisfy the constraints. This is easily accomplished by making $Z_1=Z$ at some point to the right of the other roots. This gives the other root of $P_2$, designated $P_{2b}$. All of the necessary conditions are thus completely satisfied.

It has been assumed that the driving-point impedances have only complex conjugate roots. The only use made of this assumption was the consequent positive sign of the impedance function on the real axis. This fact ensured that for $P/P_2P_4$ and $Q/P_2P_4$ the residues in the negative real poles, arbitrarily assumed, had alternating signs in the alternate poles. If real zeroes and poles of the impedance function are allowed to be present, it restricts the choice of $P_2P_4$ such that the negative real roots of $P_2P_4$ lie in those regions on the real axis where the impedance function has a positive sign. Since such regions almost always exist, the presence of critical frequencies of impedance functions on the real axis does not invalidate the method proposed in any way.

If the impedance function has a negative sign on the whole negative real axis, a second negative-impedance converter is required ahead of the passive network 7, as shown in Fig. 3. The added converter 16 is connected at one end to the terminals 5 and 6 of the network 7 and at the other end of the terminals 17 and 18 at which the unrestricted impedance Z appears. The components 7, 8, and 9 may be of the same type as described above in connection with Fig. 1.

The relevant steps in obtaining an unrestricted impedance $Z(p)$ of rank $n$ with the branch shown in Fig. 1 using R-C structures for the network 7 and the termination 9 may be enumerated as follows:

(1) Choose two polynomials $P_1$ and $Q_1$, each of degree $n$. These have negative real roots interlaced as shown in Fig. 2 and the smallest root of $Q_1$ is closest to the origin.

(2) Evaluate $Z(p)$ at some point on the negative real axis closer to the origin than the root of $Q_1$ nearest to the origin.

(3) Make $Z(p)=Z_1=P_1/Q_1$ at this point merely by multiplying $Z_1$ by an appropriate constant.

(4) Find $P_2R$ from (23), and find the roots of $P_2R$.

(5) Assign the appropriate roots to $P_2$ such that the roots of $P_2$ and $Q_1$ interlace on the real axis, as shown in Fig. 2.

(6) Determine R from steps 4 and 5 and find $g^2=R^2$, $P'=PR$, and $Q'=QR$.

(7) Express $-Q'/P_2Q_1$ in partial-fraction form to obtain $Q_3/Q_1-P_4/P_2$.

(8) All of the polynomials have thus been determined. The impedances $Z_1$, $Z_2$, and $Z_L$ are determined from (6), (7), (8), and (9). The transfer impedance $Z_4$ is found from Equation 12.

(9) The four-terminal R-C network 7 and the two-terminal R-C termination 9 are now synthesized from these impedances.

An example of an impedance branch of the type shown in Fig. 1 will now be presented. It is assumed that the desired driving-point impedance at the terminals 5 and 6 is $$Z(p)=\frac{p^2+2.2}{p^2+0.16p+3.4} \qquad (24)$$

Since $Z(p)$ is only of rank 2, the first method described above will be used. The first step is to express $Z(p)$ in the form of Equation 3. The polynomials $P_2$ and $P_4$ are chosen arbitrarily as $$P_2=p+1 \qquad (25)$$
$$P_4=p+2 \qquad (26)$$

and the numerator and denominator of (3) expanded in the partial-fraction form. In this way, $P_1$, $P_3$, $Q_1$, and $Q_3$ are found to be $$P_1=p+4.2 \qquad (27)$$
$$P_3=6.2 \qquad (28)$$
$$Q_1=p+5.24 \qquad (29)$$
$$Q_3=7.08 \qquad (30)$$

Since $p^2$ does not appear, it is obvious that $g^2$ cannot be a perfect square, as required for physical realizability of the network 7. As pointed out above, this can be remedied by adding a properly chosen constant K to both $Q_1/P_2$ and $Q_3/P_4$. The new $Q_1$ and $Q_3$, which will be called $Q_1'$ and $Q_3'$, respectively, are thus found from the expressions $$Q_1'=\left[\frac{Q_1}{P_2}+K\right]P_2=Q_1+KP_2 \qquad (31)$$

$$Q_3'=\left[\frac{Q_3}{P_4}+K\right]P_4=Q_3+KP_4 \qquad (32)$$

Using these new values, $$P_1Q_3'-P_3Q_1'=Kp^2+0.88p+2.2K-2.75 \qquad (33)$$

To find the value of K which makes this expression a perfect square, set $$0.88^2=4K(2.2K-2.75) \qquad (34)$$

and solve for K. The positive root is $$K=1.318 \qquad (35)$$

From (31) and (32), $$Q_1'=2.318(p+2.83) \qquad (36)$$
$$Q_3'=1.318(p+7.37) \qquad (37)$$

The impedances for the network 7 are now found to be $$Z_1=\frac{P_1}{Q_1'}=\frac{p+4.2}{2.318(p+2.83)} \qquad (38)$$

$$Z_4=\frac{\sqrt{P_1Q_3'-P_3Q_1'}}{Q_1'}=\frac{1.148(p+0.333)}{2.318(p+2.83)} \qquad (39)$$

The network 7 may now be synthesized as an R-C structure from these values of $Z_1$ and $Z_4$. The ladder-type structure 15 shown in Fig. 4 between the terminals 5—6 and 11—12 is one form. The elements will have the following values:

$$R_1=0.667 \text{ ohm} \qquad (40)$$
$$R_2=14.15 \text{ ohms} \qquad (41)$$
$$R_3=1.22 \text{ ohms} \qquad (42)$$
$$C_1=0.212 \text{ farad} \qquad (43)$$

The wanted impedance $Z_2$ at the terminals 11—12 of the network 15 is $$Z_2=\frac{Q_3'}{Q_1'}=\frac{1.318}{2.318}\,\frac{p+7.37}{p+2.83} \qquad (44)$$

$$=0.569\frac{p+7.37}{p+2.83} \qquad (45)$$

But this impedance $Z_2'$ as computed from the elements shown is $$Z_2'=0.4326\frac{p+7.37}{p+2.83} \qquad (46)$$

Therefore, the terminating impedance $Z_L$ connected to the terminals 13—14 of the converter 8 must be rescaled by a factor of $Z_2'/Z_2$, which is equal to 0.4326/0.569 or 0.773. The rescaled impedance $Z_L'$ is thus given by $$Z_L'=0.773Z_L \qquad (47)$$

$$=0.773\frac{P_4}{P_2}=0.773\frac{p+2}{p+1} \quad (48)$$

Figure 4:
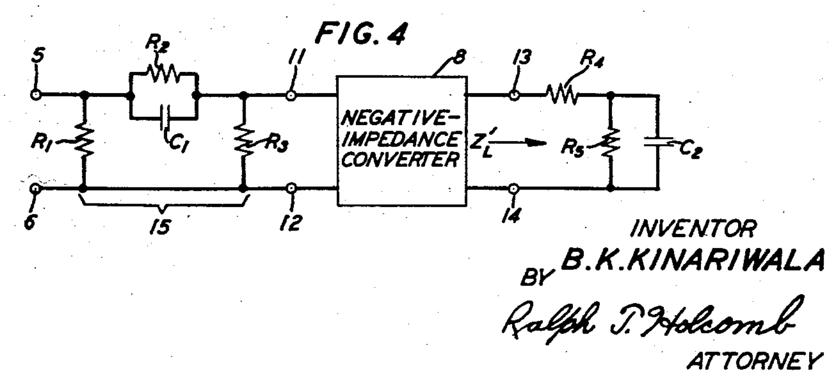
Fig. 4 is a schematic circuit of an embodiment of the branch shown in Fig. 1.

This impedance may be synthesized into the two-terminal R-C structure shown in Fig. 4, in which the elements have the values $$R_4=0.762 \text{ ohm} \quad (49)$$

$$R_5=0.762 \text{ ohm} \quad (50)$$

$$C_2=1.313 \text{ farads} \quad (51)$$

It is to be understood that the above-described arrangement is only illustrative of the application of the principles of the invention. Numerous other arrangements may be devised by those skilled in the art without departing from the spirit and scope of the invention.

What is claimed is:

1. An active impedance branch of impedance Z with poles and zeroes at preselected frequencies comprising a two-terminal-pair network including only resistors and capacitors terminated at one end in an impedance branch including a negative-impedance converter and only resistors and capacitors the impedance of which is the negative of the impedance of the network at the one end at the frequencies of the poles of Z when the network is open-circuited at the other end and also at the frequencies of the zeroes of Z when the network is short-circuited at the other end.

2. In combination, a four-terminal network and a termination connected to one end thereof, the network including only resistors and capacitors and the termination including only a negative-impedance converter, resistors, and capacitors, the combination having a driving-point impedance Z with poles and zeroes at predetermined frequencies, and the impedance of the termination being the negative of the impedance of the network at the one end at the frequencies of the poles of Z when the network is open-circuited at the other end and also at the frequencies of the zeroes of Z when the network is short-circuited at the other end.

3. In combination, a four-terminal network, a negative-impedance converter connected at one end to one end of the network, and a termination for the converter, the combination having a driving-point impedance Z with poles and zeroes at predetermined frequencies, the network and the termination including only resistors and capacitors, and the driving-point impedance of the converter at the one end being the negative of the driving-point impedance of the network at the one end at the frequencies of the poles of Z when the network is open-circuited at the other end and also at the frequencies of the zeroes of Z when the network is short-circuited at the other end.

4. In combination, a two-port passive network, a negative-impedance converter connected at one end to one end of the network, and a termination connected to the other end of the converter, the driving-point impedance Z at the other end of the network having poles and zeroes at any desired points in the complex frequency plane, the network and the termination including only resistors and capacitors, and the impedance of the termination being equal to the impedance of the network at the one end at the frequencies of the poles of Z when the network is open-circuited at the other end and also at the frequencies of the zeroes of Z when the network is short-circuited at the other end.

5. In combination, two negative-impedance converters, a passive two-port network, and a termination, the first converter being connected at one end to one port of the network, the second converter being connected at one end to the other port of the network, the termination being connected to the other end of the second converter, the driving-point impedance Z at the other end of the first converter being unrestricted as to poles and zeroes, the network and the termination including only resistors and capacitors, and the driving-point impedance of the second converter at the one end being the negative of the driving-point impedance of the network at the other port at the frequencies of the poles of Z when the network is open-circuited at the one port and also at the frequencies of the zeroes of Z when the network is short-circuited at the one port.

References Cited in the file of this patent

UNITED STATES PATENTS 2,788,496 Linvill ---------------- Apr. 9, 1957